United States Patent
Arslan et al.

(10) Patent No.: US 7,729,434 B2
(45) Date of Patent: Jun. 1, 2010

(54) SYSTEM AND METHOD FOR IMPROVED CHANNEL ESTIMATION FOR WIRELESS OFDM SYSTEMS

(75) Inventors: Huseyin Arslan, Tampa, FL (US); Hisham A. Mahmoud, Tampa, FL (US)

(73) Assignee: University of South Florida, Tampa, FL (US)

( * ) Notice: Subject to any disclaimer, the term of this patent is extended or adjusted under 35 U.S.C. 154(b) by 634 days.

(21) Appl. No.: 11/616,912

(22) Filed: Dec. 28, 2006

(65) Prior Publication Data

US 2007/0153926 A1 Jul. 5, 2007

Related U.S. Application Data

(60) Provisional application No. 60/754,817, filed on Dec. 29, 2005.

(51) Int. Cl.
*H04L 27/28* (2006.01)
*H04B 1/10* (2006.01)

(52) U.S. Cl. ...................... 375/260; 375/350

(58) Field of Classification Search ............ 375/260, 375/285, 316, 324, 340–341, 346, 348, 350; 370/503
See application file for complete search history.

(56) References Cited

U.S. PATENT DOCUMENTS

| | | | |
|---|---|---|---|
| 6,654,432 B1 * | 11/2003 | O'Shea et al. | 375/354 |
| 7,023,928 B2 * | 4/2006 | Laroia et al. | 375/260 |
| 7,251,283 B2 * | 7/2007 | Chen | 375/260 |
| 2003/0115061 A1 * | 6/2003 | Chen | 704/240 |
| 2004/0170227 A1 * | 9/2004 | Frank et al. | 375/260 |

OTHER PUBLICATIONS

M.K. Ozdemir and H. Arslan, "Channel estimation for wireless MIMO-OFDM systems," Submitted to IEEE Surveys.
J. J. Van De Beek, O. Edfors, M. Sandel, S. Wilson, and P. Borjesson, "On channel estimation in OFDM systems," in Proc. IEEE Vehic. Technol. Conf. (VTC), vol. 2, Chicago, IL, Jul. 1995, pp. 815-819.
C. Athaudage and A. Jayalath, "Enhanced MMSE channel estimation using timing error statistics for wireless OFDM systems," IEEE Tran. Broadcasting, vol. 50, No. 4, pp. 369-376, Dec. 2004.
V. Srivastava, C. K. Ho, P. H. W. Fung, and S. Sun, "Robust MMSE channel estimation in OFDM systems with practical timing synchronization," in Proc. IEEE Wireless Commun. Networking Conf. (WCNC), vol. 2, Atlanta, GA, Mar. 2004, pp. 711-716.
A. Peled and A. Ruiz, "Frequency domain data transmission using reduced computational complexity algorithms," in Proc. IEEE Conf. on Acoustics, Speech, and Signal Processing (ICASSO), vol. 5, Apr. 1980, pp. 964-967.

(Continued)

*Primary Examiner*—Khanh C Tran
(74) *Attorney, Agent, or Firm*—Molly L. Sauter; Smith & Hopen, P.A.

(57) ABSTRACT

In accordance with an embodiment of the present invention, a novel system and method for MMSE channel estimation are provided that take synchronization errors, either intentional or unintentional, into account during the channel estimation process. The proposed channel estimation in accordance with the present invention improves the noise averaging capability and takes advantage of channel correlation fully by removing the effect of synchronization errors during the estimation process.

18 Claims, 4 Drawing Sheets

OTHER PUBLICATIONS

O. Edfors, M. Sandell, J. J. Van De Beek, S. Wilson, and P. Borjesson, "OFDM channel estimation by singular value decomposition," IEEE Tran. Communications, vol. 46, No. 7, pp. 931-939, Jul. 1998.

J. Heiskala and J. Terry, OFDM Wireless LANs: A theoretical and Practical Guide. Sams publishing 2002.

T.M. Schmidl, D.C. Cox, "Robust frequency and timing synchronization for OFDM," Communications, IEEE Transactions on, vol. 45, No. 12, pp. 1613-1621, Dec. 1997.

T. Keller, L. Hanzo, "Adaptive multicarrier modulation: a convenient framework for time-frequency processing in wireless communications ," Proceedings of the IEEE, vol. 88, No. 5, pp. 611-640, May 2000.

T. Keller, L. Piazzo, P. Mandarini, L. Hanzo, "Orthogonal frequency division multiplex synchronization techniques for frequency-selective fading channels," Selected Areas in Communications, IEEE Journal on, vol. 19, No. 6, pp. 999-1008, Jun. 2001.

C.R.N. Athaudage, "BER sensitivity of OFDM systems to time synchronization error," Communication Systems, 2002. ICCS 2002. The 8th International Conference on, vol. 1, pp. 42-46, vol. 1, Nov. 25-28, 2002.

Hsieh, Meng-Han, and Wei, Cho-Ho, "Channel Estimation for OFDM systems based on comb-type Pilot Arrangement in Frequency Selective Fading Channels," Consumer Electronica, IEEE Transactions, vol. 44, Iss. 1, Feb. 1998.

* cited by examiner

Fig. 1. Channel estimation MSE performance with synchronization errors and truncated Gaussian timing offset.

Fig. 2. Timing offset PDF before and after using our algorithms ($E_b/N_0 = 10$ dB).

Fig. 3. Channel estimation MSE performance with synchronization errors and uniform timing offset.

SYSTEM AND METHOD FOR IMPROVED CHANNEL ESTIMATION FOR WIRELESS OFDM SYSTEMS

CROSS-REFERENCE TO RELATED APPLICATIONS

This application claims priority from U.S. Provisional Patent Application No. 60/754,817, filed on Dec. 29, 2005, and titled, "System and Method for Improved Channel Estimation for Wireless OFDM Systems".

BACKGROUND OF THE INVENTION

Wireless communication systems have evolved substantially over the last two decades. The explosive growth of the wireless communication market is expected to continue in the future, as the demand for all types of wireless services is increasing. Due to their ability to provide high data rates for multimedia applications, Orthogonal Frequency Division Multiplexing (OFDM) is gaining a strong interest for wide-area, local area, and personal area networks. In OFDM, carrier frequencies are chosen in such a way that there is no influence of other carriers in the detection of the information in the carrier of interest when the orthogonality of the carrier is maintained. Maintaining this orthogonality requires some special care for the frequency and symbol timing synchronizations. Cyclic extension of the symbols is usually used to relax the requirements for symbol synchronization.

In wireless OFDM systems, channel estimation is an integral part of the coherent receiver design as the performance of the receiver is greatly affected by the quality of the channel estimation. Extensive studies on the topic can be found in the literature. In OFDM systems, channel estimation is frequently employed in the frequency domain after taking the Discrete Fourier Transform (DFT) of the time synchronized digital samples. There are numerous approaches for estimating the Channel Frequency Response (CFR) over the OFDM subcarriers. The direct Least-Squares (LS) estimation assumes the channel over each subcarrier to be independent. However, in practice, the CFR is often oversampled over these subcarriers, and the estimated coefficients are correlated. On the other hand, the noise in these subcarriers can be independent. By exploiting the correlation of CFR over OFDM subcarriers, the noise can be reduced significantly, and hense the channel estimation accuracy can be improved. Assuming that the channel frequency correlation and noise variance are known, Minimum Mean-Square Error (MMSE) filtering of the LS estimates has been shown to provide optimal performance under Additive White Gaussian (AWGN).

Many of the channel estimation approaches proposed in the literature assume perfect symbol timing. However, in practice, the symbol timing used in OFDM systems is not perfect. As such, the symbol timing is often intentionally shifted towards the Cyclic Prefix (CP) so that any possible error in symbol timing that might create the loss of orthogonality can be avoided. Even though this intentional bias in synchronization avoids the loss of orthogonality of the carriers and intercarrier-interference, it results in the effective CFR to be less correlated due to the additional carrier-dependent phase shift. Synchronization errors in the receiver cause a linear phase rotation at the output of the DFT block. The correlation between the channel coefficients at different subcarriers is weakened due to this phase rotation. As a result, the performance of MMSE channel estimation degrades significantly since the noise averaging effect will be reduced.

Accordingly, what is needed in the art is an improved system and method for performing Minimum Mean-Square Error (MMSE) channel estimation in an Orthogonal Frequency Division Multiplexing (OFDM) channel under synchronization errors.

SUMMARY OF INVENTION

In accordance with a particular embodiment of the present invention, one approach to solving the problem of synchronization errors is by estimating the timing offset and removing the linear phase rotation caused by it. Fortunately, the linear phase of the estimated channel in the frequency domain is mainly due to the timing offset with less effect from the noise and the actual multi-path channel. So by estimating and removing the linear phase of the estimated channel the system performance can be improved, especially for medium and high signal-to-noise ration (SNR) values.

In accordance with an embodiment of the present invention, a method for improving the Minimum Mean-Square Error (MMSE) channel estimation in an Orthogonal Frequency Division Multiplexing (OFDM) channel under synchronization errors includes the steps of receiving data over a multipath OFDM channel, estimating a timing offset for the channel, wherein the timing offset results from synchronization errors in the channel, estimating a linear phase rotation resulting from the synchronization errors in the channel, wherein the linear phase rotation is dependent upon the estimated timing offset, estimating a channel frequency response for the channel using a direct least-squares estimation, removing the estimated linear phase rotation from the estimated channel frequency response estimate, filtering the channel frequency response estimate for the channel using the MMSE channel estimation and then adding the estimated linear phase rotation back into the filtered channel frequency response estimate.

In a specific embodiment, the step of estimating a timing offset for the channel further comprises approximating the channel linear phase to the nearest value in $C=[C_0 C_1 \ldots C_{N-CP-1}]$, to obtain $C_d$ where $\hat{d}$ is the timing offset estimate.

In an additional embodiment, another approach to remedy the effect of timing offsets is by increasing the channel correlation. Since the timing offset weakens the correlation between the channel's frequency coefficients, by removing the linear phase corresponding to different timing offset values and choosing the one that results in the channel with maximum correlation we can get a very good estimate of the timing offset. Moreover, even with a wrong timing offset assumed, we would still be left with a highly correlated channel thus improving the channel estimation performance. Another advantage to this approach is its independence of the noise level, since the noise is uncorrelated between different frequency subcarriers as long as their orthogonality is maintained.

As such, in accordance with an additional embodiment of the present invention, the step of estimating a timing offset resulting from the synchronization errors of the channel further includes estimating a timing offset by identifying the timing offset that results in a maximum correlation of the channel in the frequency domain. In a particular embodiment, the timing offset estimating further includes calculating the timing offset $\hat{d}$ where:

$$\tilde{d} = \arg\max_d \sum_{\Delta=0}^{n} R_{\tilde{H}}(\Delta)$$

where $R_{\tilde{H}}(\Delta)=E\{\tilde{H}_k^\dagger \tilde{H}_{k+\Delta}\}$, is the frequency-domain channel correlation function with a frequency separation $\Delta$, $\tilde{d}$ is the timing offset estimate, $\tilde{H}=\Theta_d^{-1}\hat{H}$ and n is the maximum correlation lags considered in the identification of the timing offset with the maximum correlation in the frequency domain.

In accordance with the present invention, filtering the channel frequency response for the channel using the MMSE channel estimation further includes estimating the channel frequency response using:

$$\tilde{H}_{MMSE}=\Theta_d F^\dagger \Theta_d^{-1}\hat{H}_{LS}, \text{ where } F^\dagger=\tilde{R}_{HH}(\tilde{R}_{HH}+\sigma^2 I)^{-1}$$

and where, $\tilde{H}_{MMSE}$ is the MMSE channel estimation, $\hat{H}_{LS}$ is the least-squares estimate of H, F is the MMSE filter, I is N×N identity matrix, $R_{HH}=E\{\tilde{H}\tilde{H}^\dagger\}$, $\tilde{H}=\Theta_d^{-1}\hat{H}$, $\sigma^2$ is the variance of the complex zero-mean white Gaussian noise vector of the channel, $\Theta_d$ is a diagonal matrix containing the phase rotation, $\exp(2j\pi \tilde{d}/N)$, and $\tilde{d}$ is the timing offset estimate.

The present invention provides a system for improving the Minimum Mean-Square Error (MMSE) channel estimation in an Orthogonal Frequency Division Multiplexing (OFDM) channel under synchronization errors. One embodiment of the system in accordance with the present invention includes an OFDM receiver which includes circuitry for receiving data over a multipath OFDM channel, circuitry for estimating a timing offset for the channel, wherein the timing offset results from synchronization errors in the channel, circuitry for estimating a linear phase rotation resulting from the synchronization errors in the channel, wherein the linear phase rotation is dependent upon the estimated timing offset, circuitry for estimating a channel frequency response for the channel using a direct least-squares estimation, circuitry for removing the estimated linear phase rotation from the estimated channel frequency response estimate, circuitry for filtering the channel frequency response estimate for the channel using the MMSE channel estimation and circuitry the estimated linear phase rotation back into the filtered channel frequency response estimate.

In an additional embodiment, the OFDM receiver of the system in accordance with the present invention includes circuitry for estimating a timing offset for the channel further by approximating the channel linear phase to the nearest value in $C=[C_0 C_1 \ldots C_{N-CP-1}]$, to obtain $C_d$ where $\tilde{d}$ is the timing offset estimate.

The OFDM receiver may also include circuitry for estimating a timing offset resulting from the synchronization errors of the channel by estimating a timing offset by identifying the timing offset that results in a maximum correlation of the channel in the frequency domain. In a specific embodiment, the timing offset d is $$\tilde{d} = \arg\max_d \sum_{\Delta=0}^{n} R_{\tilde{H}}(\Delta),$$

where $R_{\tilde{H}}(\Delta)=E\{\tilde{H}_k^\dagger \tilde{H}_{k+\Delta}\}$, is the frequency-domain channel correlation function with a frequency separation $\Delta$, $\tilde{d}$ is the timing offset estimate, $\tilde{H}=\Theta_d^{-1}\hat{H}$ and n is the maximum correlation lags considered in the identification of the timing offset with the maximum correlation in the frequency domain.

The OFDM receiver of the system in accordance with the present invention may further include circuitry for filtering the channel frequency response for the channel using the MMSE channel estimation further comprises, estimating the channel frequency response using $\tilde{H}_{MMSE}=\Theta_d F^\dagger \Theta_d^{-1}\hat{H}_{LS}$, where $F^\dagger=\tilde{R}_{HH}(\tilde{R}_{HH}+\sigma^2 I)^{-1}$ and where, $\tilde{H}_{MMSE}$ is the MMSE channel estimation, $\hat{H}_{LS}$ is the least-squares estimate of H, F is the MMSE filter, I is N×N identity matrix, $R_{HH}=E\{\tilde{H}\tilde{H}^\dagger\}$, $\tilde{H}=\Theta_d^{-1}\hat{H}$, $\sigma^2$ is the variance of the complex zero-mean white Gaussian noise vector of the channel, $\Theta_d$ is a diagonal matrix containing the phase rotation, $\exp(2j\pi \tilde{d}/N)$, and $\tilde{d}$ is the timing offset estimate.

Accordingly, the embodiments of the present invention are effective in improving the system performance, thus allowing the system to operate at higher noise levels with less errors and better channel estimation.

As such, the present invention provides a novel system and method for MMSE channel estimation that takes synchronization errors (intentional or not) into account. The proposed channel estimation in accordance with the present invention improves the noise averaging capability and takes advantage of channel correlation fully by removing the effect of synchronization errors during the estimation process.

BRIEF DESCRIPTION OF THE DRAWINGS

For a fuller understanding of the invention, reference should be made to the following detailed description, taken in connection with the accompanying drawings, in which.

DETAILED DESCRIPTION OF THE PREFERRED EMBODIMENT

Figure 1:
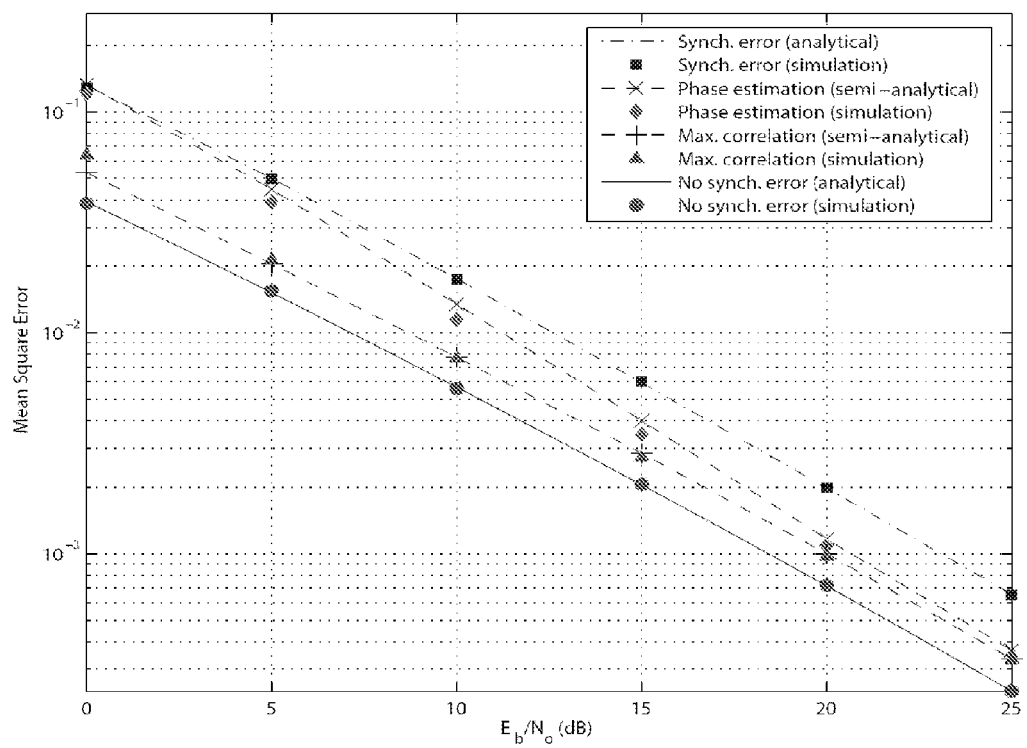
FIG. 1 is a graphical illustration of the Channel Estimation MSE performance with synchronization errors in accordance with an embodiment of the present invention.

According to a particular embodiment of the invention, we consider an N subcarrier OFDM system with $X_k$ as the frequency domain transmitted symbol at the kth subcarrier. The time domain complex baseband data sequence $x=[x_0 x_1 \ldots x_{N-1}]^T$ is obtained at the output of the Inverse Discrete Fourier transform (IDFT) block with $X=[X_0 X_1 \ldots X_{N-1}]^T$ as the input. Before transmission, a cyclic prefix of length $N_{CP}$ is added at the beginning of the data sequence to eliminate the Inter-Symbol Interference (ISI) and preserve the orthogonality of the frequency subcarriers. The data is then transmitted over a multipath channel. The time domain channel impulse response is described as a pulse train $$h(t) = \sum_{i=0}^{l-1} \alpha_i(t)\delta_i(t-\tau_i) \quad (1)$$

Where l is the total number of paths, $\alpha_i(t)$ is complex-valued Gaussian random variable with zero mean, and $\tau_i$ is the delay of the ith path. The CP length $N_{CP}$ is chosen such that $0 < \tau_{l-1} < N_{CP}T_S$ where $T_S$ is the sampling interval so that ISI will be eliminated. The received signal is sampled and fed into an N-point DFT block. The output of the DFT block is $$Y = XH + W \quad (2)$$

Where Y is the received vector, X is a diagonal matrix containing the transmitted signal, H is the channel vector, and W is a complex zero-mean Gaussian noise with variance $\sigma^2$.

When there are no synchronization errors (zero timing offset) the MMSE channel estimation is as follows:

$$\hat{H}_{MMSE} = F^\dagger \hat{H}_{LS} \quad (3)$$

and $$F^\dagger = R R_{HH}(R_{HH} + \sigma^2 I)^{-1} \quad (4)$$

Where F is the MMSE filter, I is N×N identity matrix, $R_{HH} = E\{HH^\dagger\}$ is the channel autocorrelation matrix (the superscript $(.)^\dagger$ denotes the Hermitian transpose), and $\hat{H}_{LS}$ is the LS estimate of H, $$\hat{H}_{LS} = X^{-1}Y = H + X^{-1}W \quad (5)$$

However, a timing synchronization error will cause an offset of d samples at the input of the receiver DFT block. For no ISI, the timing offset d should be $0 \leq d \leq N_{CP} - l - 1$. Since d can have negative values, an intentional timing offset is usually added at the receiver to guarantee that $d \geq 0$. When the timing offset is within this range, the equivalent CFR at subcarrier k is $$\overline{H}_k = H_k \exp\left(\frac{j2\pi dk}{N}\right) \quad (6)$$

The received frequency domain signal including the synchronization error can then be presented as $$Y = X\overline{H} + W = X\Theta_d H + W \quad (7)$$

where $\Theta_d$ is a diagonal matrix containing the phase rotation $\exp(j2\pi dk/N)$, $k=0,1,\ldots N-1$. Due to this timing offset, the effective channel will appear to be changing at a faster rate than the actual channel and the correlation between the channel coefficients at different subcarriers will be weaker. As a result, the performance of the MMSE estimation will degrade.

As previously described in the background of the invention, synchronization errors in the OFDM receiver will result in a linear phase rotation that is dependent on the timing offset d. The present invention provides a system and method to estimate this phase rotation and reverse its effect.

The channel phase at subcarrier k $$\angle(\overline{H}_k) = \angle(H_k) + C_d k \quad (8)$$

where $C_d = j2\pi d/N$, and $d=0,1,\ldots N_{CP}-l-1$. So, the linear phase component of the effective channel is equal to $(C_d + \phi)$ where $\phi$ is the linear phase introduced by the actual channel $H_k$. However, the phase of the actual channel is random with a uniform distribution between 0 and $\pi$, which means that $C_d$ is the dominant component in the linear phase of the effective channel. By approximating the channel linear phase to the nearest value in $C = [C_0 C_1 \ldots C_{N-CP-l}]$, we obtain $C_{\hat{d}}$ where $\hat{d}$ is the timing offset estimate. The autocorrelation matrix is then given by $$\tilde{R}_{HH} + E\{\tilde{H}\tilde{H}^\dagger\} \quad (9)$$

where $\tilde{H} = \Theta_{\hat{d}}^{-1}\overline{H}$, and $\Theta_{\hat{d}}$ is a diagonal matrix containing $\exp(2j\pi\hat{d}/N)$. If the timing offset is perfectly estimated, then $\hat{d} = d$ and $\tilde{H} = H$ which is the actual CFR. The MMSE estimation is given by $$\hat{H}_{MMSE} = \Theta_{\hat{d}} F^\dagger \Theta_{\hat{d}}^{-1} \hat{H}_{LS} \quad (10)$$

where $$F^\dagger = \tilde{R}_{HH}(\tilde{R}_{HH} + \sigma^2 I)^{-1} \quad (11)$$

As shown in (10) first the estimated phase rotation is removed from the channel LS estimate $\Theta_{\hat{d}}^{-1}\hat{H}_{LS}$ and then the MMSE estimation filter F is applied. Again, if the timing offset estimation is perfect, F will be the same filter used when there are no synchronization errors. Finally, $\Theta_{\hat{d}}$ is added. In other words, the timing offset d estimation and then the actual channel MMSE estimation steps are performed separately.

Since the synchronization errors weaken the correlation between the channel coefficients at different subcarriers, the present invention will choose the timing offset resulting in a channel with maximum correlation. Usually, the maximum correlation is obtained when $\hat{d} = d$. However, even if an error has been made is estimating d, the MMSE estimation will then be performed on a highly correlated version of the channel with less variation, thus improving the MMSE overall performance. First, the timing offset d is found that results in the channel with maximum correlation in the frequency domain $$\hat{d} = \arg\max_d \sum_{\Delta=0}^{n} R_{\tilde{H}}(\Delta) \quad (12)$$

where $$R_H(\Delta) = E\{\tilde{H}_k^\dagger \tilde{H}_{k+\Delta}\} \quad (13)$$

is the frequency-domain channel correlation function with a frequency separation $\Delta$, and $\tilde{H} = \Theta_{\hat{d}}^{-1}\overline{H}$ and n is the maximum correlation lags considered. After finding the timing offset $\hat{d}$ that results in maximum correlation, the MMSE estimation is calculated as in (9) and (10).

The system performance is expressed in terms of Mean Square Error (MSE). First, the case of no synchronization error is considered. The mean square error at a subcarrier k is, $$\epsilon_k = E\{|\hat{H}_k - H_k|^2\} \quad (14)$$

The average MSE is found to be, $$\varepsilon = \frac{1}{N}\sum_{k=0}^{N-1}\varepsilon_k \quad (15)$$

$$= \frac{1}{N}Tr[S_H - R_{HH}F^\dagger - F^\dagger R_{HH} + F^\dagger(R_{HH} + \sigma^2 I)F]$$

where Tr(.) denotes the trace of a matrix and $S_H$ is a diagonal matrix containing $E\{|H_k|^2\}$ (which is equal to the diagonal elements of $R_{HH}$). By substituting (4) into (15) and using the fact that $R_{HH}^{\dagger}=R_{HH}$, $$\varepsilon = \frac{1}{N} Tr[S_H - R_{HH}(R_{HH} + \sigma^2 S_H)^{-1} R_{HH}] \quad (16)$$

$$= \frac{1}{N} Tr(S_H - F^{\dagger} R_{HH})$$

The channel autocorrelation matrix is obtained as follows, $$R_{HH}(k_1, k_2) = \sum_{i=0}^{l-1} p_i \exp\left[\frac{-j2\pi(k_1 - k_2)i}{N}\right] \quad (17)$$

where $p=[p_0 p_1 \ldots p_{l-1}]$ is the channel Power Delay Profile (PDP) vector. The average MSE with synchronization errors can be derived using (16) and (17) with a small modification. The channel PDP will be exchanged with the effective power delay profile $p^E$, where $p^E$ is the convolution of the channel PDP and the timing offset Probability Density Function (PDF).

To evaluate the performance of the method of the present invention, a new error term $\gamma_d$ is defined, where $$\gamma_d = d - \hat{d} \quad (18)$$

The significance of this term is that after removing the estimated phase, the estimated CFR at subcarrier k is $$\tilde{H}_k = H_k \exp\left(\frac{j2\pi\gamma_d k}{N}\right) \quad (19)$$

Note the resemblance between (6) and (19). Hence, to evaluate the average MSE for one of the proposed methods, first $p^\gamma$ is obtained, where $p^\gamma$ is the convolution of the channel PDP and the PDF of $\gamma_d$. Next, equations (16) and (17) with $p^\gamma$ instead of p are used to obtain the average MSE. The PDF of $\gamma_d$ can be obtained through computer simulations.

In an exemplary embodiment, an OFDM system with N=64 frequency subcarriers and a CP of length $N_{CP}=16$ samples is considered. Accordingly, a 5-tap channel with an exponential PDP such that the power of the ith path is given by $$p_i = \frac{e^{-2i}}{\sum_{i=1}^{5} e^{-2i}} \quad (20)$$

$$i = 1, 2, 3, 4, 5$$

The timing offset d caused by the synchronization block is approximated as a truncated Gaussian random variable with zero mean and a variance of 4 samples$^2$, where $-5 \leq d \leq 5$. The Gaussian approximation is based on the timing offset's statistical distribution of some of the existing synchronization techniques. In the receiver, an intentional timing offset of 5 samples is added to guarantee non-negative overall timing offset. The average MSE is obtained and plotted against the ratio of energy per bit to the spectral noise density ($E_b/N_0$) as illustrated in FIG. 1.

Figure 2:
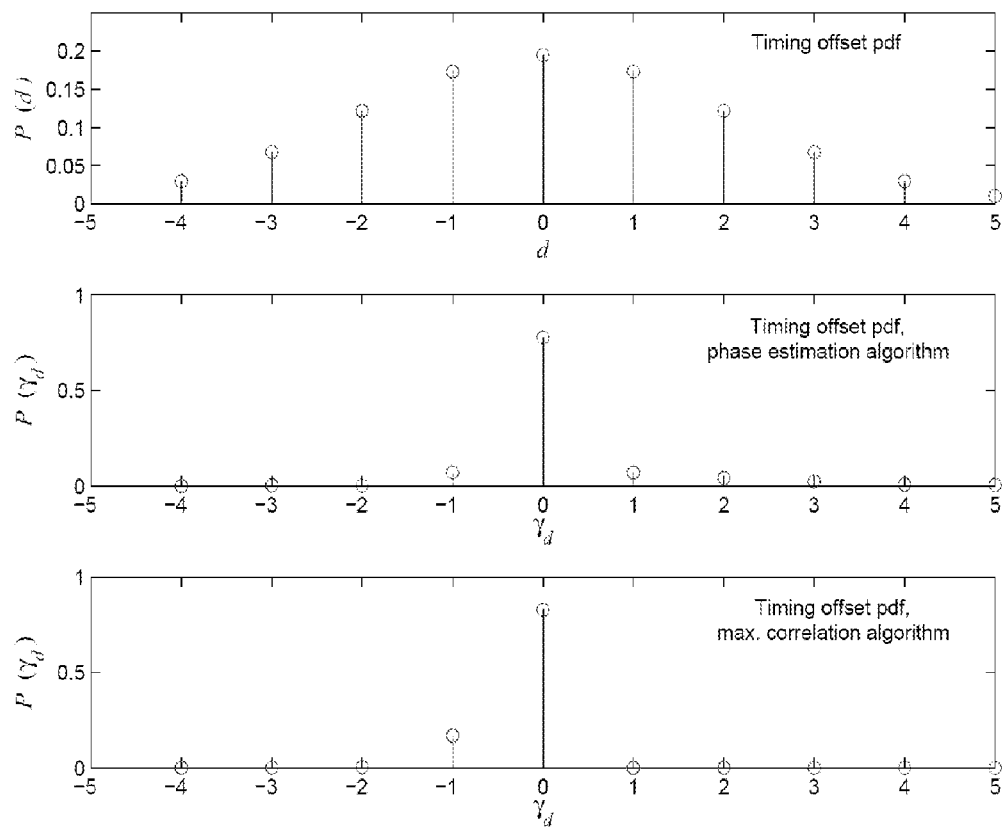
FIG. 2 is a graphical illustration of the Timing offset pdf before and after the embodiment of the present invention have been implemented in accordance with the present invention ($E_b/N_0=10$ dB).

The timing offset PDF for $\gamma_d$ at different $E_b/N_0$ values is obtained to evaluate the semi-analytical performance of the methods in accordance with the present invention. FIG. 2 illustrates the timing offset PDF before 10 and after using the phase estimation method in accordance with the present invention 15 and after using the maximum correlation method 20 in accordance with the present invention at $E_b/N_0=10$ dB. Note the significant improvement in the timing error.

Figure 3:
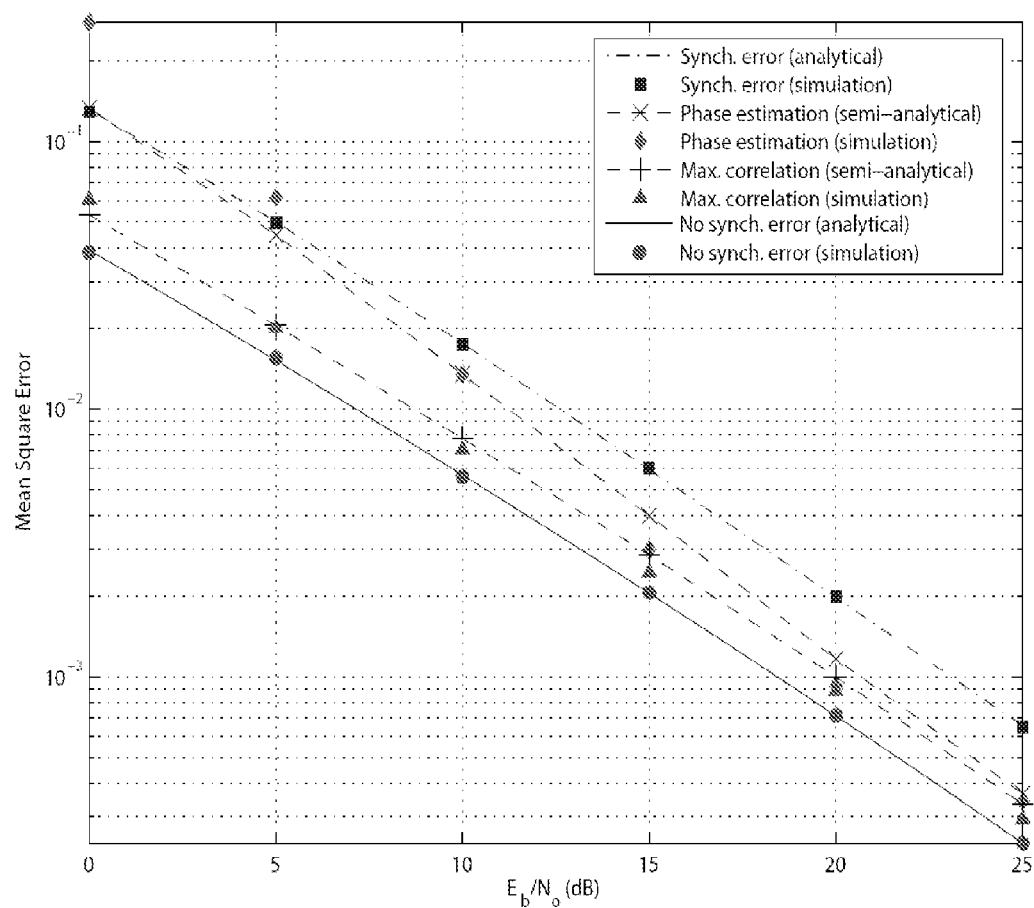
FIG. 3 is a graphical illustration of the Channel Estimation MSE with synchronization errors and uniform timing offset in accordance with an embodiment of the present invention.
Figure 4:
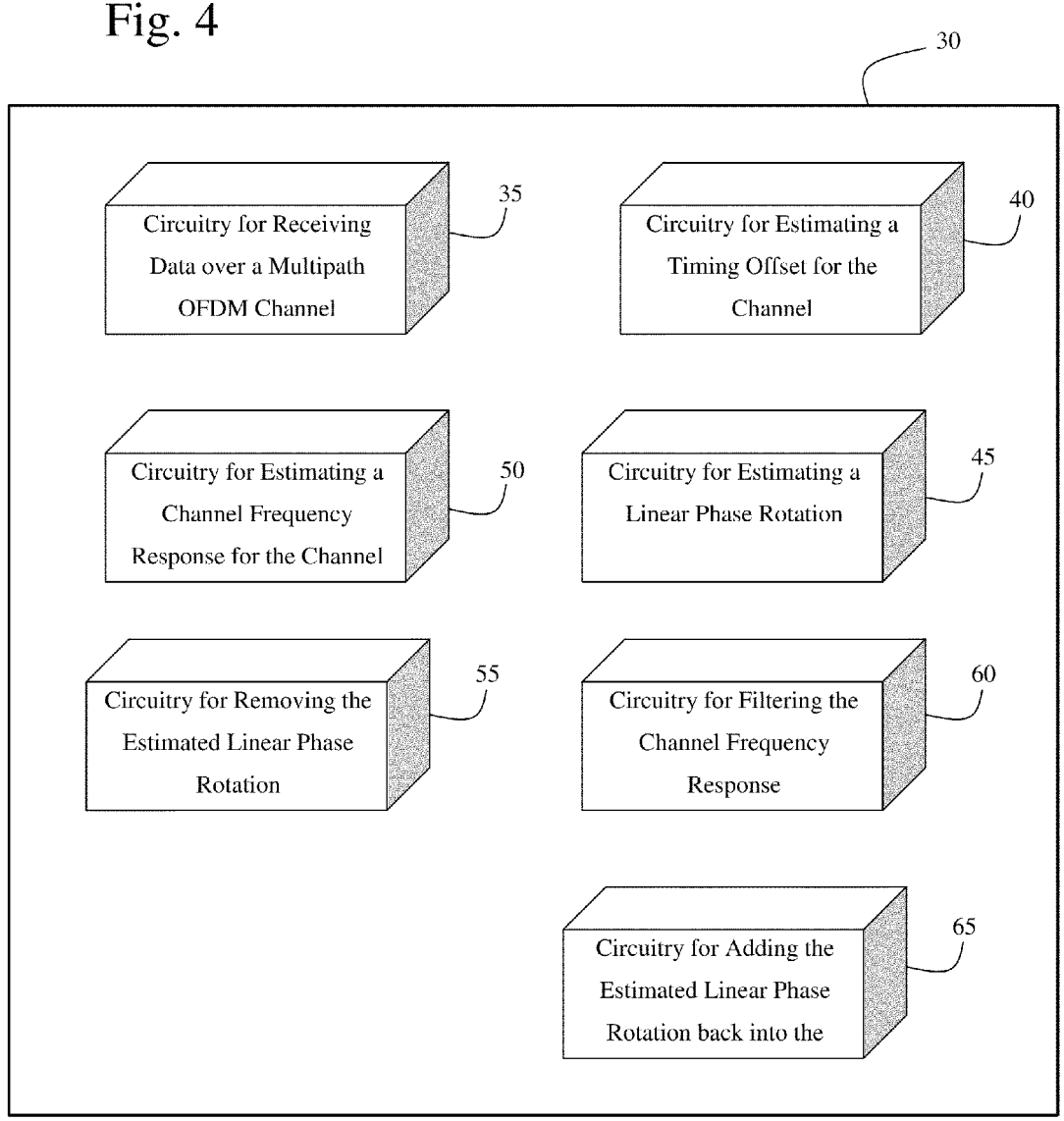
FIG. 4 is block diagram illustrating the components of the OFDM receiver in accordance with an embodiment of the present invention.

Simulation results are used to confirm the semi-analytical results shown in FIG. 1. Note that at MSE=$2 \times 10^{-3}$ a loss of about 5 dB is caused by the synchronization errors. As shown, a gain of 3.5 dB is achieved using the maximum correlation method in accordance with the present invention and a gain of 2 dB is achieved using the phase estimation algorithm in accordance with the method of the present invention. Furthermore, at low $E_b/N_0$ values, the performance of the phase estimation method in accordance with the present invention degrades. This is expected since for lower $E_b/N_0$, the contribution of the noise to the phase of the estimated channel is higher. However, this is not the case for the maximum correlation method in accordance with the present invention, since the noise (regardless of its level) is uncorrelated across the OFDM subcarriers as long as the orthogonality is maintained. In FIG. 1, it can be seen that the gain of the maximum correlation method in accordance with the present invention is constant for different values of $E_b/N_0$ while the gain of the phase estimation method in accordance with the present invention is improving with higher $E_b/N_0$. At high values of $E_b/N_0$, both methods give almost the same performance. FIG. 3, illustrates the results in FIG. 1 as they are evaluated again, but this time for a timing offset with uniform distribution between −5 and 5. It can be seen that the improvements introduced by the methods in accordance with the present invention hold for different timing offset PDF. Additionally, the maximum correlation method in accordance with the present invention has a higher computational complexity than the phase estimation method in accordance with the present invention.

One embodiment of the system in accordance with the present invention includes an OFDM receiver 30 which includes circuitry for receiving data over a multipath OFDM channel 35, circuitry for estimating a timing offset for the channel 40, wherein the timing offset results from synchronization errors in the channel, circuitry for estimating a linear phase rotation resulting from the synchronization errors in the channel 45, wherein the linear phase rotation is dependent upon the estimated timing offset, circuitry for estimating a channel frequency response for the channel using a direct least-squares estimation 50, circuitry for removing the estimated linear phase rotation from the estimated channel frequency response estimate 55, circuitry for filtering the channel frequency response estimate for the channel using the MMSE channel estimation 60 and circuitry the estimated linear phase rotation back into the filtered channel frequency response estimate 65.

In an additional embodiment, the OFDM receiver 30 of the system in accordance with the present invention includes circuitry for estimating a timing offset for the channel 40 further by approximating the channel linear phase to the nearest value in $C=[C_0 C_1 \ldots C_{N-CP-1}]$, to obtain $C_{\hat{d}}$ where $\hat{d}$ is the timing offset estimate.

The OFDM receiver 30 may also include circuitry for estimating a timing offset 40 resulting from the synchronization errors of the channel by estimating a timing offset by identifying the timing offset that results in a maximum correlation of the channel in the frequency domain. In a specific embodiment, the timing offset d is $$\tilde{d} = \arg\max_d \sum_{\Delta=0}^{n} R_{\tilde{H}}(\Delta),$$

where $R_{\tilde{H}}(\Delta) = E\{\tilde{H}_k^* \tilde{H}_{k+\Delta}\}$, is the frequency-domain channel correlation function with a frequency separation $\Delta$, $\tilde{d}$ is the timing offset estimate, $\tilde{H} = \Theta_d^{-1}\hat{H}$ and n is the maximum correlation lags considered in the identification of the timing offset with the maximum correlation in the frequency domain.

The OFDM receiver 30 of the system in accordance with the present invention may further include circuitry for filtering the channel frequency response for the channel using the MMSE channel estimation further comprises, estimating the channel frequency response 60 using $\tilde{H}_{MMSE} = \Theta_d F \Theta_d^{-1} \hat{H}_{LS}$, where $F = \tilde{R}_{HH}(\tilde{R}_{HH} + \sigma^2 I)^{-1}$ and where, $\tilde{H}_{MMSE}$ is the MMSE channel estimation, $\hat{H}_{LS}$ is the least-squares estimate of H, F is the MMSE filter, I is N×N identity matrix, $R_{HH} = E\{\tilde{H}\tilde{H}^*\}$, $\tilde{H} = \Theta_d^{-1}\hat{H}$, $\sigma^2$ is the variance of the complex zero-mean white Gaussian noise vector of the channel, $\Theta_d$ is a diagonal matrix containing the phase rotation, $\exp(2j\pi\tilde{d}/N)$, and $\tilde{d}$ is the timing offset estimate.

The present invention considers MMSE channel estimation for OFDM systems under synchronization errors. The present invention provides a system and method to combat the effect of synchronization errors and restore the performance of the MMSE estimation. In accordance with one embodiment of the present invention, the linear phase rotation is estimated—caused by the timing offset in the receiver—and is removed before applying the MMSE estimation. In an additional embodiment, the timing offset is removed that results in the maximum correlated channel. Both embodiments exhibit a significant improvement in the MMSE estimation performance.

Additionally, a derivation is presented for the performance of the two embodiments. Simulation results are used to check the semi-analytical results. Note that the phase estimation algorithm gain improves for lower noise levels because of the noise effect on the linear phase estimation. On the other hand, the maximum correlation algorithm gain is constant even for high noise levels since the noise is uncorrelated between subcarriers. This, however, comes at the cost of higher computational complexity.

It will be seen that the advantages set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween. Now that the invention has been described,

What is claimed is:

1. A method for improving a Minimum Mean-Square Error (MMSE) channel estimation in an Orthogonal Frequency Division Multiplexing (OFDM) channel under synchronization errors, the method comprising the steps of:
   receiving data over a multipath OFDM channel;
   estimating a timing offset for the channel, wherein the timing offset results from synchronization errors in the channel;
   estimating a linear phase rotation resulting from the synchronization errors in the channel, wherein the linear phase rotation is dependent upon the estimated timing offset;
   estimating a channel frequency response for the channel using a direct least-squares estimation;
   removing the estimated linear phase rotation from the estimated channel frequency response estimate;
   filtering the channel frequency response estimate for the channel using the MMSE channel estimation; and
   adding the estimated linear phase rotation back into the filtered channel frequency response estimate.

2. The method of claim 1, wherein the step of estimating a timing offset for the channel further comprises approximating a channel linear phase to the nearest value in $C = [C_0 C_1 \ldots C_{N-CP-1}]$, to obtain $C_d$ where $\tilde{d}$ is the timing offset estimate.

3. The method of claim 1, wherein the step of estimating a timing offset resulting from the synchronization errors of the channel further comprises estimating a timing offset by identifying the timing offset that results in a maximum correlation of the channel in the frequency domain.

4. The method of claim 3, wherein the step of estimating a timing offset by identifying the timing offset that results in a maximum correlation of the channel in the frequency domain further comprises, calculating the timing offset d where:

$$\tilde{d} = \arg\max_d \sum_{\Delta=0}^{n} R_{\tilde{H}}(\Delta)$$

where $R_{\tilde{H}}(\Delta) = E\{\tilde{H}_k^* \tilde{H}_{k+\Delta}\}$, is the frequency-domain channel correlation function with a frequency separation $\Delta$, $\tilde{d}$ is the timing offset estimate, $\tilde{H} = \Theta_d^{-1}\hat{H}$ and n is the maximum correlation lags considered in the identification of the timing offset with the maximum correlation in the frequency domain.

5. The method of claim 1, wherein the step of filtering the channel frequency response for the channel using the MMSE channel estimation further comprises, estimating the channel frequency response using:

$$\tilde{H}_{MMSE} = \Theta_d F \Theta_d^{-1} \hat{H}_{LS} \text{ where, } F = \tilde{R}_{HH}(\tilde{R}_{HH} + \sigma^2 I)^{-1}$$

and where, $\tilde{H}_{MMSE}$ is the MMSE channel estimation, $\hat{H}_{LS}$ is the least-squares estimate of H, F is the MMSE filter, I is N×N identity matrix, $R_{HH} = E\{\tilde{H}\tilde{H}^*\}$, $\tilde{H} = \Theta_d^{-1}\hat{H}$, $\sigma^2$ is the variance of the complex zero-mean white Gaussian noise vector of the channel, $\Theta_d$ is a diagonal matrix containing the phase rotation, $\exp(2j\pi\tilde{d}/N)$, and $\tilde{d}$ is the timing offset estimate.

6. A method for improving a Minimum Mean-Square Error (MMSE) channel estimation in an Orthogonal Frequency Division Multiplexing (OFDM) channel under synchronization errors, the method comprising the steps of:
   receiving data over a multipath OFDM channel;
   estimating a timing offset for the channel by approximating a channel linear phase to the nearest value in $C = [C_0 C_1 \ldots C_{N-CP-1}]$, to obtain $C_d$ where $\tilde{d}$ is the timing offset estimate and wherein the timing offset results from synchronization errors in the channel;
   estimating a linear phase rotation resulting from the synchronization errors in the channel, wherein the linear phase rotation is dependent upon the estimated timing offset;
   estimating a channel frequency response for the channel using a direct least-squares estimation;

removing the estimated linear phase rotation from the estimated channel frequency response estimate;
filtering the channel frequency response estimate for the channel using the MMSE channel estimation; and
adding the estimated linear phase rotation back into the filtered channel frequency response estimate.

7. A method for improving a Minimum Mean-Square Error (MMSE) channel estimation in an Orthogonal Frequency Division Multiplexing (OFDM) channel under synchronization errors, the method comprising the steps of:
receiving data over a multipath OFDM channel;
estimating a timing offset resulting from the synchronization errors of the channel by identifying the timing offset that results in a maximum correlation of the channel in the frequency domain;
estimating a linear phase rotation resulting from the synchronization errors in the channel, wherein the linear phase rotation is dependent upon the estimated timing offset;
estimating a channel frequency response for the channel using a direct least-squares estimation;
removing the estimated linear phase rotation from the estimated channel frequency response estimate;
filtering the channel frequency response estimate for the channel using the MMSE channel estimation; and
adding the estimated linear phase rotation back into the filtered channel frequency response estimate.

8. The method of claim 7, wherein the step of estimating a timing offset by identifying the timing offset that results in a maximum correlation of the channel in the frequency domain further comprises, calculating the timing offset d where:

$$\tilde{d} = \underset{d}{\operatorname{argmax}} \sum_{\Delta=0}^{n} R_{\tilde{H}}(\Delta)$$

where $R_{\tilde{H}}(\Delta)=E\{\tilde{H}_k\tilde{H}_{k+\Delta}\}$, is the frequency-domain channel correlation function with a frequency separation $\Delta$, $\tilde{d}$ is the timing offset estimate, $\tilde{H}=\Theta_d^{-1}\overline{H}$ and n is the maximum correlation lags considered in the identification of the timing offset with the maximum correlation in the frequency domain.

9. The method of claim 1, wherein the synchronization errors are unintentionally introduced into the channel.

10. The method of claim 1, wherein the synchronization errors are intentionally introduced into the channel.

11. A system for improving a Minimum Mean-Square Error (MMSE) channel estimation in an Orthogonal Frequency Division Multiplexing (OFDM) channel under synchronization errors, the system comprising an OFDM receiver comprising:
circuitry for receiving data over a multipath OFDM channel;
circuitry for estimating a timing offset for the channel, wherein the timing offset results from synchronization errors in the channel;
circuitry for estimating a linear phase rotation resulting from the synchronization errors in the channel, wherein the linear phase rotation is dependent upon the estimated timing offset;
circuitry for estimating a channel frequency response for the channel using a direct least-squares estimation;
circuitry for removing the estimated linear phase rotation from the estimated channel frequency response estimate;
circuitry for filtering the channel frequency response estimate for the channel using the MMSE channel estimation; and
circuitry for adding the estimated linear phase rotation back into the filtered channel frequency response estimate.

12. The system of claim 11, wherein the receiver further comprises circuitry for estimating a timing offset for the channel further by approximating a channel linear phase to the nearest value in $C=[C_0 C_1 \ldots C_{N-CP-1}]$, to obtain $C_{\tilde{d}}$ where $\tilde{d}$ is the timing offset estimate.

13. The system of claim 11, wherein the receiver further comprises circuitry for estimating a timing offset resulting from the synchronization errors of the channel by estimating a timing offset by identifying the timing offset that results in a maximum correlation of the channel in the frequency domain.

14. The system of claim 11, wherein the receiver further comprises circuitry for estimating a timing offset by identifying the timing offset that results in a maximum correlation of the channel in the frequency domain further comprises, calculating the timing offset d where:

$$\tilde{d} = \underset{d}{\operatorname{argmax}} \sum_{\Delta=0}^{n} R_{\tilde{H}}(\Delta)$$

where $R_{\tilde{H}}(\Delta)=E\{\tilde{H}_k\tilde{H}_{k+\Delta}\}$, is the frequency-domain channel correlation function with a frequency separation $\Delta$, $\tilde{d}$ is the timing offset estimate, $\tilde{H}=\Theta_d^{-1}\overline{H}$ and n is the maximum correlation lags considered in the identification of the timing offset with the maximum correlation in the frequency domain.

15. The system of claim 11, wherein the receiver further comprises circuitry for filtering the channel frequency response for the channel using the MMSE channel estimation further comprises, estimating the channel frequency response using:

$$\tilde{H}_{MMSE}=\Theta_d F\Theta_d^{-1}\hat{H}_{LS} \text{ where, } F=\tilde{R}_{HH}(\tilde{R}_{HH}\sigma^2 I)^{-1}$$

and where, $\tilde{H}_{MMSE}$ is the MMSE channel estimation, $\hat{H}_{LS}$ is the least-squares estimate of H, F is the MMSE filter, I is N×N identity matrix, $R_{HH}=E\{\tilde{H}\tilde{H}\}$, $\tilde{H}=\Theta_d^{-1}\overline{H}$, $\sigma^2$ is the variance of the complex zero-mean white Gaussian noise vector of the channel, $\Theta_d$ is a diagonal matrix containing the phase rotation, $\exp(2j\pi\tilde{d}/N)$, and $\tilde{d}$ is the timing offset estimate.

16. A system for improving a Minimum Mean-Square Error (MMSE) channel estimation in an Orthogonal Frequency Division Multiplexing (OFDM) channel under synchronization errors, the system comprising:
circuitry for receiving data over a multipath OFDM channel;
circuitry for estimating a timing offset for the channel by approximating a channel linear phase to the nearest value in $C=[C_0 C_1 \ldots C_{N-CP-1}]$, to obtain $C_{\tilde{d}}$ where $\tilde{d}$ is the timing offset estimate and wherein the timing offset results from synchronization errors in the channel;
circuitry for estimating a linear phase rotation resulting from the synchronization errors in the channel, wherein the linear phase rotation is dependent upon the estimated timing offset;
circuitry for estimating a channel frequency response for the channel using a direct least-squares estimation;

circuitry for removing the estimated linear phase rotation from the estimated channel frequency response estimate;

circuitry for filtering the channel frequency response estimate for the channel using the MMSE channel estimation; and circuitry for adding the estimated linear phase rotation back into the filtered channel frequency response estimate.

17. A system for improving a Minimum Mean-Square Error (MMSE) channel estimation in an Orthogonal Frequency Division Multiplexing (OFDM) channel under synchronization errors, the system comprising an OFDM receiver comprising circuitry for receiving data over a multipath OFDM channel;

circuitry for estimating a timing offset resulting from the synchronization errors of the channel by identifying the timing offset that results in a maximum correlation of the channel in the frequency domain;

circuitry for estimating a linear phase rotation resulting from the synchronization errors in the channel, wherein the linear phase rotation is dependent upon the estimated timing offset;

circuitry for estimating a channel frequency response for the channel using a direct least-squares estimation;

circuitry for removing the estimated linear phase rotation from the estimated channel frequency response estimate;

circuitry for filtering the channel frequency response estimate for the channel using the MMSE channel estimation; and circuitry for adding the estimated linear phase rotation back into the filtered channel frequency response estimate.

18. The system of claim 17, wherein the receiver further comprises circuitry for estimating a timing offset by identifying the timing offset that results in a maximum correlation of the channel in the frequency domain further comprises, calculating the timing offset d where:

$$\tilde{d} = \underset{d}{\mathrm{argmax}} \sum_{\Delta=0}^{n} R_{\tilde{H}}(\Delta)$$

where $R_{\tilde{H}}(\Delta) = E\{\tilde{H}_k \tilde{H}_{k+\Delta}\}$, is the frequency-domain channel correlation function with a frequency separation $\Delta$, $\tilde{d}$ is the timing offset estimate, $\tilde{H} = \Theta_d^{-1} \overline{H}$ and n is the maximum correlation lags considered in the identification of the timing offset with the maximum correlation in the frequency domain.

* * * * *